US006104497A

United States Patent [19]

Cohen et al.

[11] Patent Number: 6,104,497

[45] Date of Patent: Aug. 15, 2000

[54] PROCESSES AND APPARATUSES FOR CONVERTING AN ANALOG DOCUMENT REPRODUCTION DEVICE TO A DIGITAL DOCUMENT REPRODUCTION DEVICE

[75] Inventors: Jay S. Cohen, Highland Heights, Ky.; James C. Vago; James R. Witte, both of Cincinnati, Ohio

[73] Assignee: MFNCFF Corporation, Cincinnati, Ohio

[21] Appl. No.: 08/971,077

[22] Filed: Nov. 14, 1997

[51] Int. Cl.[7] ..... H04N 1/00

[52] U.S. Cl. ..... 358/1.13; 358/401

[58] Field of Search ..... 358/442, 448, 358/434, 474, 296, 401, 400, 1.13, 1.9, 1.1, 1.6, 1.12; 399/2, 8, 85, 81

[56] References Cited

U.S. PATENT DOCUMENTS

| | | | |
|---|---|---|---|
| 4,051,535 | 9/1977 | Inglis | 358/231 |
| 4,251,153 | 2/1981 | Levine | 355/3 R |
| 4,331,875 | 5/1982 | Wolfe | 250/398 |
| 4,588,282 | 5/1986 | Levine | 355/3 R |
| 4,655,577 | 4/1987 | Ikuta | 355/3 R |
| 4,660,961 | 4/1987 | Kuramoto et al. | 355/4 |
| 4,843,426 | 6/1989 | Levine | 355/202 |
| 5,235,437 | 8/1993 | Katagiri et al. | 358/471 |
| 5,270,779 | 12/1993 | Kawai | 355/313 |
| 5,365,306 | 11/1994 | Delueg et al. | 355/38 |
| 5,371,574 | 12/1994 | Ohmura et al. | 355/208 |
| 5,402,249 | 3/1995 | Koseki et al. | 358/446 |
| 5,475,500 | 12/1995 | Takeda | 358/468 |
| 5,500,738 | 3/1996 | Noguchi | 358/300 |
| 5,708,508 | 1/1998 | Soma et al. | 358/296 |

*Primary Examiner*—Madeleine Nguyen
*Attorney, Agent, or Firm*—James C. Vago

[57] ABSTRACT

A method for converting an analog document reproduction device to a digital document reproduction device is provided, wherein the analog document reproduction device has a light source for illuminating at least a portion of a document, a mirror for receiving the illumination reflected by the document, a first lens for receiving the illumination from the mirror and for projecting said illumination onto a photoconductor. The photoconductor is capable of converting the illumination into a toner image of the document. The method comprises the steps of providing an assembly having a second lens for receiving the illumination reflected from the document and having a light conversion member for converting the illumination into a voltage signal. The assembly is installed in the analog document reproduction device so that the assembly can receive the illumination reflected from the document in a digital mode. A control module is installed for converting the voltage signal into digital information and a user interface is provided for selecting the digital mode, the user interface being connected to the control module.

20 Claims, 7 Drawing Sheets

START
23
76
78
80
44
42
40
42
46
38
42
31
39
26
22
28
32
24
L
I
I
R
36
R
30
R
R

PROCESSES AND APPARATUSES FOR CONVERTING AN ANALOG DOCUMENT REPRODUCTION DEVICE TO A DIGITAL DOCUMENT REPRODUCTION DEVICE

TECHNICAL FIELD OF THE INVENTION

This invention relates generally to the field of processes and apparatuses for producing a copy of a document, and, more particularly, to the field of processes and apparatuses for converting an analog document reproduction device to a digital document reproduction device which is capable of producing a digital representation of a document.

BACKGROUND OF THE INVENTION

Analog document reproduction devices or photocopiers (sometimes commonly referred to as XEROX® machines) are known in the art and have, in fact, become common place in most offices and homes. These analog document reproduction devices typically operate by scanning a document with a light source and converting the light image of the document into a toner image of the same, which is thereafter affixed to paper. More recently, digital or multi-media document reproduction devices have begun entering the market. While these digital document reproduction devices can provide the capability of producing a digital representation of a document which can be later manipulated or uploaded to a computer, they are often expensive and complex such that their use is still limited.

As such, there exists a need for simple and relatively inexpensive processes and apparatuses for converting the large number of existing analog document reproduction devices to digital document reproduction devices. Still further, there is a continuing need to provide processes and apparatuses for converting an analog document reproduction device to a digital document reproduction device while still retaining an analog document reproduction capability.

SUMMARY OF THE INVENTION

Accordingly, it is an object of the present invention to obviate the above-described problems and shortcomings of document reproduction devices.

It is another object of the present invention to provide processes and apparatuses for converting an existing analog document reproduction device to a digital document reproduction device.

It is yet another object of the present invention to provide processes and apparatuses for converting a light image of a document into a digital representation of the same.

It is still another object of the present invention to provide processes and apparatuses for converting an existing analog document reproduction device to a digital document reproduction device which can operate in either an analog mode or a digital mode.

It is a further object of the present invention to provide processes and apparatuses for converting an existing analog document reproduction device to a digital document reproduction device which can interface with a computer network.

It is still a further object of the present invention to provide apparatuses and is processes for converting an analog document reproduction device to a digital document reproduction device which are simple and relatively inexpensive to implement.

A method for converting an analog document reproduction device to a digital document reproduction device is provided, wherein the analog document reproduction device has a light source for illuminating at least a portion of a document, a mirror for receiving the illumination reflected by the document, a first lens for receiving the illumination from the mirror and for projecting said illumination onto a photoconductor. The photoconductor is capable of converting the illumination into a toner image of the document. The method comprises the steps of providing an assembly having a second lens for receiving the illumination reflected from the document and having a light conversion member for converting the illumination into a voltage signal. The assembly is installed in the analog document reproduction device so that the assembly can receive the illumination reflected from the document in a digital mode. A control module is installed for converting the voltage signal into digital information and a user interface is provided for selecting the digital mode, the user interface being connected to the control module.

A digital document reproduction device made in accordance with the present invention is operated by illuminating at least a portion of the document with the light source and converting the illumination reflected from the document into a voltage signal which is then converted into digital information for storage on a computer readable medium. The photoconductor can be disabled in the digital mode if necessary.

A kit for converting an analog document reproduction device to a digital document reproduction device is also provided. The kit includes an assembly having a second lens for receiving the illumination reflected from the document and a light conversion member for converting the illumination into a voltage signal. A control module for converting the voltage signal into digital information and an user interface are also provided.

BRIEF DESCRIPTION OF THE DRAWINGS

While the specification concludes with claims particularly pointing out and distinctly claiming the invention, it is believed the same will be better understood from the following description taken in conjunction with the accompanying drawings in which:

DETAILED DESCRIPTION OF THE PREFERRED EMBODIMENTS

Figure 1:
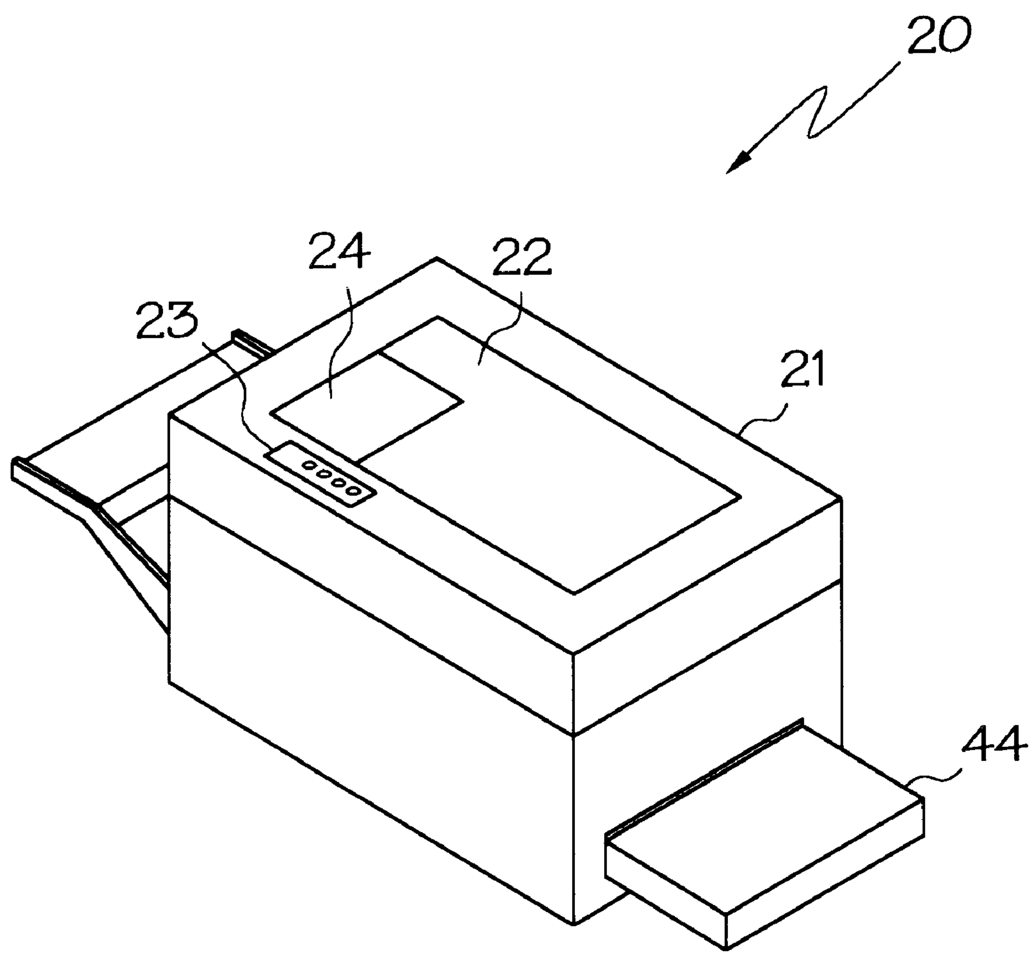
FIG. 1 is perspective view of a conventional analog document reproduction device.

Reference will now be made in detail to the present preferred embodiments of the invention, examples of which are illustrated in the accompanying drawings, wherein like numerals indicate the same elements throughout the views. As will be understood more fully hereafter, the present invention is directed toward processes and apparatuses for converting an existing analog document reproduction device to a digital document reproduction device. As shown in FIG. 1, a conventional analog document reproduction device 20, or photocopier, generally comprises a housing 21 having a transparent platen 22, formed from glass or the like, for receiving a document 24, and a control panel 23 for controlling the operation of the analog document reproduction device 20. The platen 22 is typically sized to accommodate documents of varying sizes (e.g., 8.5"×11", 11"×14", etc.). The document 24 can be provided as a single sheet of paper or as multiple sheets of paper, in which case the analog document reproduction device 20 is sometimes provided with a mechanical feeder (not shown) which can automatically feed the multiple sheets of paper across the platen 22.

Figure 2:
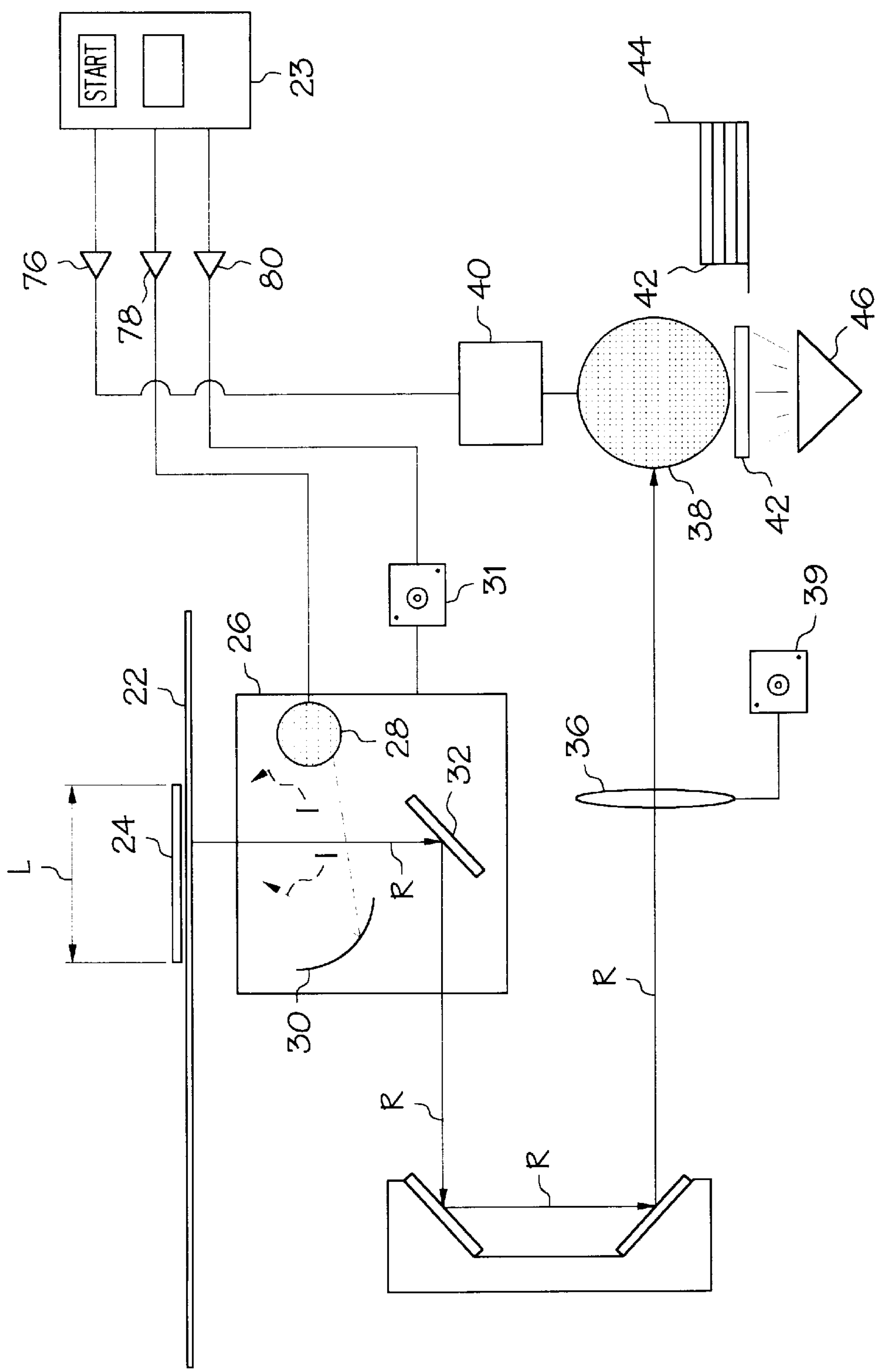
FIG. 2 is a schematic illustration of the conventional analog document reproduction device of FIG. 1.

As shown schematically in FIG. 2, the analog document reproduction device 20 further comprises a translating assembly 26 which is disposed adjacent the platen 22, a light source 28 and reflector 30. The light source 28 and reflector 30 cooperate to illuminating at least a portion of the document 24 through the platen 22. The light source 28 can be provided in the form of a halogen or fluorescent bulb which illuminates the document 24 both directly and indirectly by way of the reflector 30, as shown by the illuminating light path I. The illumination from the light source 28 is reflected by the document 24 according to the black and white or color contrasts which are imprinted on the document 24 in the form of text, graphics and the like, thereby producing a reflected light image of the portion of the document 24 which is illuminated. The translating assembly 26 is moved in a direction substantially parallel to the platen 22 by an electric motor 31 which is interconnected with the translating assembly 26 by gears, belts or the like. As the translating assembly 26 traverses the length L of the document 24, successive portions of the document 24 are illuminated.

The translating assembly 26 also comprises a first mirror 32 for receiving the illumination reflected by the document 24 as it is illuminated by the light source 28. The first mirror 32 reflects the illumination to a second mirror 34 which is disposed adjacent the translating assembly 26, as shown by the reflected light path R. The second mirror 34 preferably translates in concert with the translating assembly 26, but at one half the rate, so that the distance between the portion of the document 24 which is illuminated and a first lens 36 remains substantially constant as the translating assembly 26 traverses the length L of the document 24. The second mirror 34 directs the light reflected by the document 24 to the first lens 36 which focuses the illumination to form a light image on a photoconductor 38. An electric motor 39 interconnected with the lens 36 can be provided so that the lens 36 is also capable of limited translation for enlarging or reducing the light image formed on the photoconductor 38. The operation of the light source 28, the translating assembly 26, and the photoconductor 38 is handled by the analog control structures 76, 78 and 80. Each of these analog control structures comprise electrical elements which are responsive to user inputs from the user interface 23 so that the analog document reproduction device can produce a copy of the document 24, as described more fully hereafter.

The photoconductor 38 has a photoconductive material disposed thereon and is preferably provided in the form of a rotatable drum, as shown, a belt, or in other forms known in the art. The photoconductor 38 is electrostatically charged by a charging unit 40. The light image which is projected onto the photoconductor 38 after it has been uniformly electrostatically charged by the charging unit 40 produces a latent electrostatic image on the photoconductor which corresponds to the light image of the portion of the document 24 which is illuminated. The latent electrostatic image is converted into a toner image by application of a toner liquid or particles to the photoconductor 38. The toner image is transferred to paper 42 which is fed from a paper feeder 44 onto the photoconductor 38. The toner image is thermally fixed to the paper 42 by a fixing apparatus 46, as is well known in the art. While the present invention is described herein with respect to an analog document reproduction device having a photoconductor 38 which can be electrostatically charged, it is contemplated that the present invention can be adapted for use with other types of analog document reproduction devices, such as analog document reproduction devices having a translating platen and stationary light source.

Figure 3:
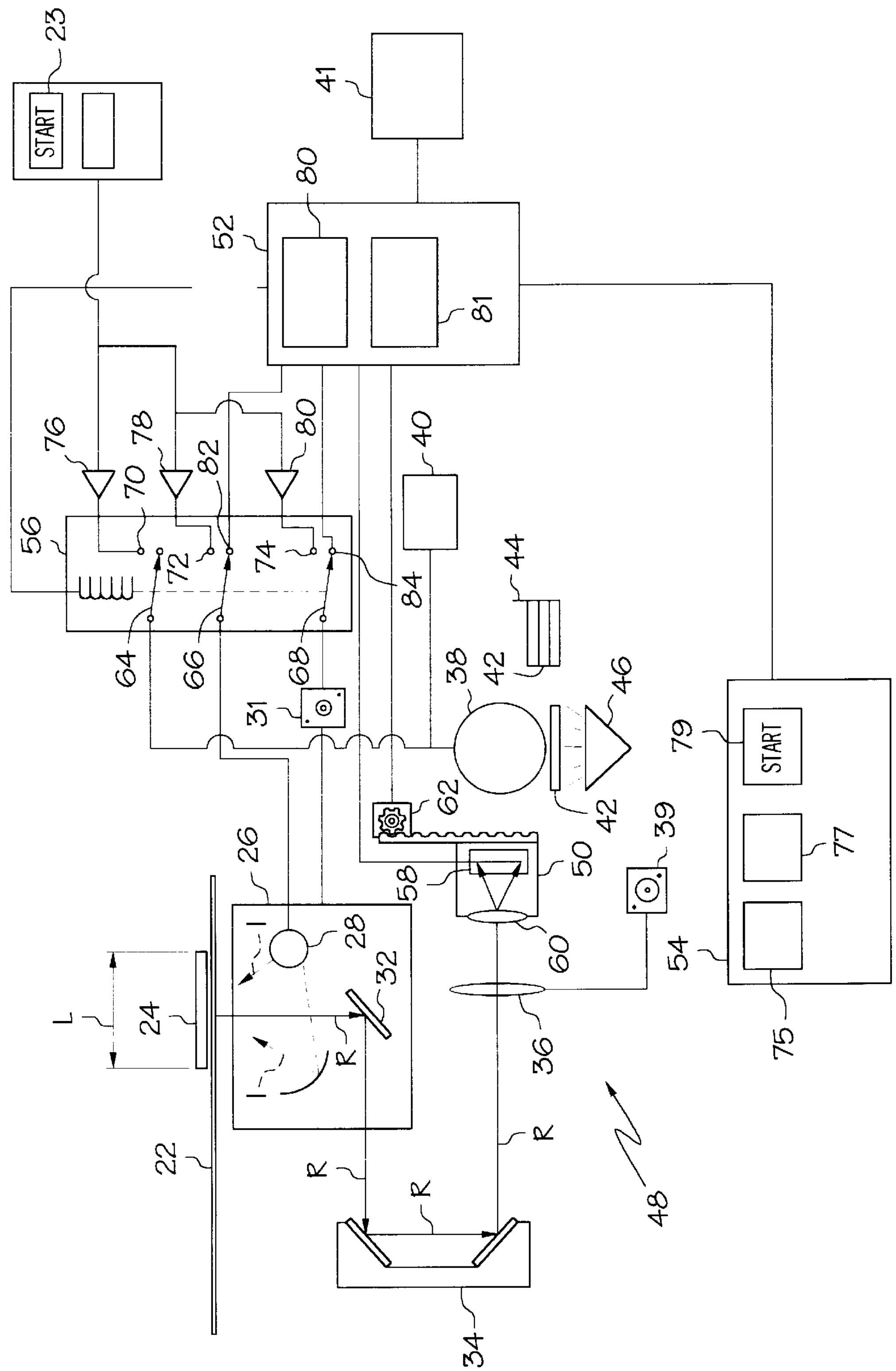
FIG. 3 is a schematic illustration of a preferred digital document reproduction device made in accordance with the present invention from the conventional analog document reproduction device of FIGS. 1 and 2, wherein the copier interface assembly is disposed adjacent the first lens and the device is illustrated as operating in its digital mode.
Figure 4:
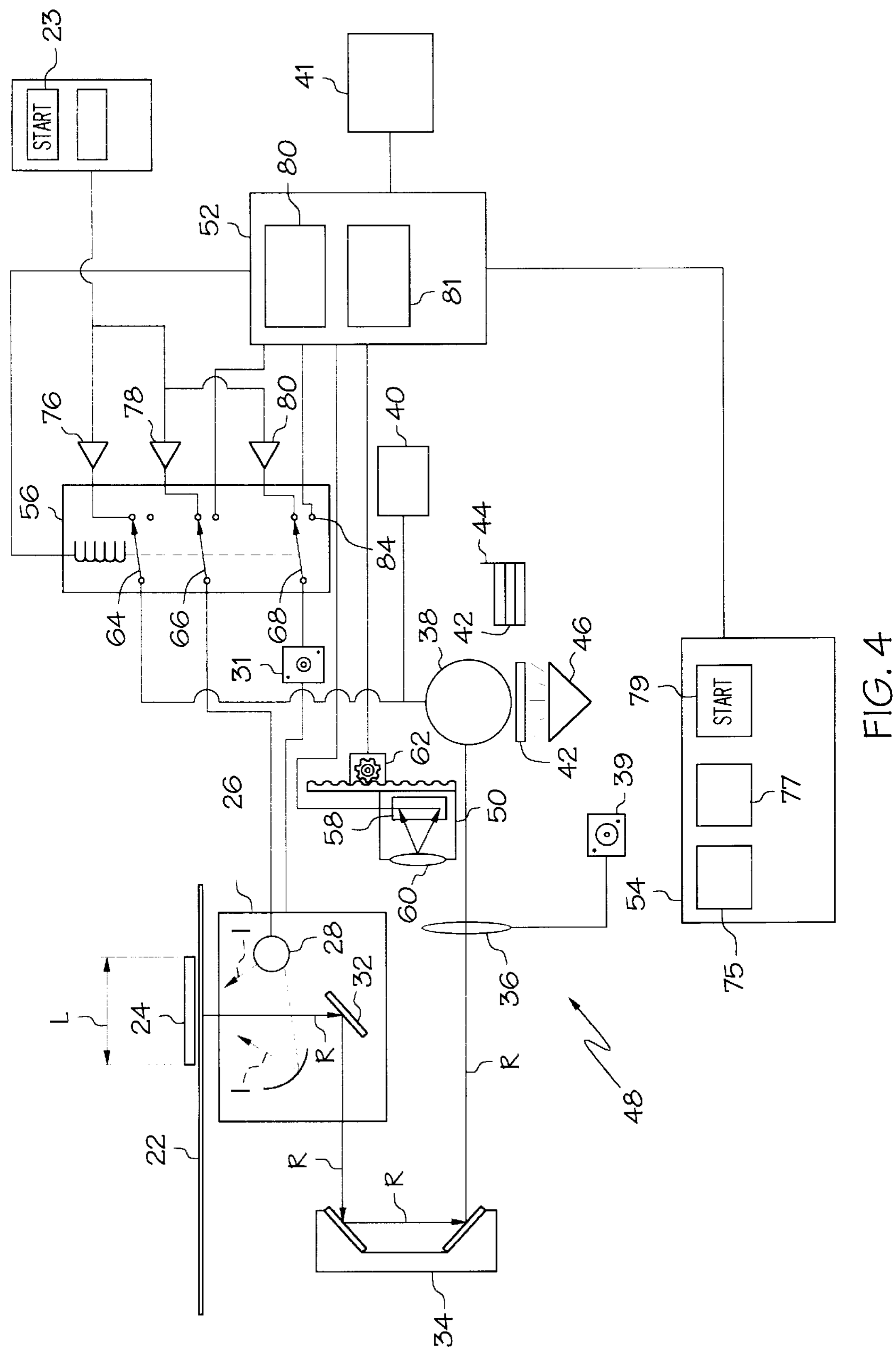
FIG. 4 is a schematic illustration of the preferred digital document reproduction device of FIG. 3, wherein the digital document reproduction device is illustrated as operating in its analog mode.

As shown in FIGS. 3 and 4 and in accordance with one aspect of the present invention, a digital document reproduction device 48 which has been converted from the exemplary analog document reproduction device 20 will now be described. While the digital document reproduction device 48 can, upon user selection, advantageously create a digital representation of the document 24, it can also still function as the previously described analog document reproduction device 20 for providing a toner image of the document 24 on the paper 42. In other words, the digital document reproduction device 48 can preferably function in an analog mode where the light image of the document 24 is reproduced on the paper 42 in cooperation with the photoconductor 38 and/or a digital mode where the light image of the document 24 is converted to a digital representation of the same for storage on a computer readable medium 41. The computer readable medium 41 can be provided in the form of any optical or magnetic storage medium known in the art but is most preferably provided in the form of floppy diskette.

As shown in FIG. 3, the digital document reproduction device 48 comprises each of the structures of the analog document reproduction device 20, and, in addition, includes a movable copier interface assembly 50, a control module 52, an user interface 54, and a switching member preferably provided in the form of a relay 56 for interconnecting the control module 52 with the analog document reproduction device 20. In addition, the switching member preferably disables operation of at least the photoconductor 38 and/or the paper feeder 44 to prevent the paper 42 from needlessly advancing when the digital document reproduction device 48 is operating in the digital mode and a toner image is not desired. The disablement of the photoconductor 38 and/or the paper feeder 44 will be necessary if the operation of the same would automatically continue in the digital mode due to the preexisting structural arrangements of the analog document reproduction device 20.

The copier interface assembly 50 preferably comprises a light conversion member 58 disposed adjacent a second lens 60. The second lens 60 of the copier interface assembly 50 is adapted to focus the illumination reflected by the document 24 onto the light conversion member 58, and the light conversion member 58 converts the light image of the portion of the document 24 illuminated by the light source 28 into a voltage signal. The copier interface assembly 50 preferably translates into the reflected light path R adjacent the first lens 36 when the digital document reproduction device 48 is operating in the digital mode, as shown in FIG. 3, and is disposed clear of the reflected light path R when the digital document reproduction device 48 is operating in the analog mode so that the light image can be transmitted to photoconductor 38 to produce a toner image of the document 24, as shown in FIG. 4. The copier interface assembly 50 can be translated into position by a rack and pinion mechanism driven by an electric motor 62 whose operation is controlled by the control module 52. Alternatively, the copier interface assembly 50 can translate, rotate, or otherwise move into position adjacent the first lens 36 by means of a cam, an eccentric drive, a belt, or the like.

In a particularly preferred embodiment, the light conversion member 58 is provided in the form of a charge coupled device (CCD) for converting the illumination it receives into a voltage signal. The charge coupled device has a plurality of light sensitive pixels, with the number of pixels determining the resolution of the digital representation of the document 24 which can be stored by the computer readable medium 41. For example, a charge coupled device having 4400 pixels would be capable of providing a resolution of about 400 dots per inch for a document having dimensions of 8.5 inches by 11 inches. The size of the charge coupled device, which is dictated by the number of pixels which are provided, in turn determines the amount of image reduction which must be provided by the combination of the first lens 36 and the second lens 60 so that the illumination reflected by the document 24 can be focused on the charge coupled device 58 to achieve a predetermined resolution. For instance, a charge coupled device having 5000 pixels which are 7$\mu$m by 7$\mu$m would have a pixel array length of about 45 mm, if the pixels are spaced 7$\mu$m apart. A document having dimensions of 8.5 inches by 11 inches would require a total image reduction of about 11% to project its 11 inch length onto at least 4400 pixels of the previously described charge coupled device. In other words, the first lens 36 and the second lens 60, in combination, would have to provide a total magnification of about 0.11 (i.e., an image reduction) to achieve a resolution of about 400 dots per inch. Preferably, the combination of the first lens 36 and the second lens 60 provide an image magnification of between about 0.11 and about 0.36, this range being capable of accommodating a resolution of between about 400 DPI and about 600 DPI for an 8.5 inch×11 inch document where the pixel size is between about 7$\mu$m and about 14$\mu$m. A second lens 60 having a focal length of between about 0.2 inches and about 10 inches can accommodate a total image magnification of between about 0.11 and about 0.36. While it is preferred that the second lens 60 be provided with the previously described focal length, it is contemplated that other focal lengths of second lens 60 can be provided based upon the desired resolution, the dimensions of the document, the size of the pixel array of the charge coupled device, and the object to lens (both the first and second lens) and image to lens (both the first and second lens) distances. In addition, it is contemplated that charge coupled devices capable of differentiating between colors can also be provided in applications where it is desired to accommodate digital information relating to the colors imprinted on the document 24.

The control module 52 preferably interfaces the copier interface assembly 50 and the translating assembly 26 through the relay 56. In addition, the control module 52 controls operation of the relay 56 which disables operation of the photoconductor 38 and/or the paper feeder 44, if required, as well as interfacing with the user interface 54. The relay 56 preferably has one or more switches, and more preferably at least three switches 64, 66, and 68, each of the switches being a double pole single throw switch, although it is contemplated that other switch configurations (e.g., double pole, double throw) can be provided. The first switch 64 preferably disables operation of the photoconductor 38 and/or the paper feeder 44 when the digital document reproduction device 48 is operating in its digital mode while the second switch 66 preferably selects whether the control module 52 or the analog control structure 78 controls operation of the light source 28. The third switch 68 preferably selects whether the control module 52 or the analog control structure 80 controls operation of the electric motor 31 which moves the translating assembly 26. Although only the three switches 64, 66, and 68 are described herein, it is contemplated that additional switches can be provided for interconnecting the control module 52 with other components of the digital document reproduction device 48. For instance, a switch could be provided for interconnecting the control module 52 with the electric motor 39 controlling movement of the first lens 36 in order to vary the image magnification so that a one of a plurality of predetermined resolutions can be selected, as discussed more fully hereafter.

Each of the first poles 70, 72 and 74 of the first, second, and third switches, respectively, are connected to the preexisting analog control structures 76, 78 and 80 of the analog document reproduction device 20. In other words, the digital document reproduction device 48 operates in its analog mode the same as the analog document reproduction 20 when the relay 56 is de-energized and each of the switches are closed across their first poles and open across their second poles, as shown in FIG. 4. Each of the second poles 82 and 84 of the second and third switches 66 and 68, respectively, are connected to the control module 52. Thus, when the relay 56 is energized so that each of the switches are closed across their second poles and open across their first poles, the digital document reproduction device 48 will operate in its digital mode, wherein the control module 52 is controlling operation of the translating assembly 26 and the copier interface assembly 50 as described more fully hereafter.

The user interface 54 preferably comprises a plurality of controls (e.g., push buttons, switches, displays, etc) for selecting the operational characteristics of the digital document reproduction device 48 when it is operating in its digital mode. Preferably, a first control 75 is provided for user selection of the digital mode of the digital document reproduction device 48 and a second control 77 is provided for selecting the type of format in which to store the digital information associated with the document 22 when the digital mode is selected. For example, the digital information can be stored as a JPEG, GIF®, or similar graphical format. The digital information can also be stored in a form which can be later directly utilized by a word processing computer program. In addition, the user interface 54 might include a control for selecting the resolution (e.g., 400 dots per inch) of the digital information which is stored on the computer readable medium 41, wherein selection of the resolution will activate the electric motor 39 to position the first lens 36 so that it, in cooperation with the second lens 60, will focus the light image on enough pixels of the light conversion member 58 to provide the desired resolution. For example, selecting a relatively high resolution might move the first lens 36 in a direction away from the light conversion member, thereby enlarging the light image so that more pixels of the light conversion member 58 will be exposed resulting in a relatively higher resolution. The user interface 54 can also be provided with a control 79 for initiating translation of the translating assembly 26. In a particularly preferred embodiment, the control 79 is enabled by the control module 52 only after the copier interface assembly 50 has been moved into the reflected light path R, as illustrated in FIG. 3.

The control module 52 preferably comprises an analog to digital converter 80 for converting the voltage signal from the light conversion member 58 to digital information. The digital information can be temporarily stored in a volatile memory 81 until after the document 22 is fully scanned by the light source 28 and before the digital information is stored on the computer readable medium 41. In addition, the control module 52 comprises the appropriate electronic circuit members for interfacing with the relay 56, the user interface 54, and for controlling the light source 28, the translating assembly 26, and the copier interface assembly 50 according to the inputs from the user interface 54.

Figure 5:
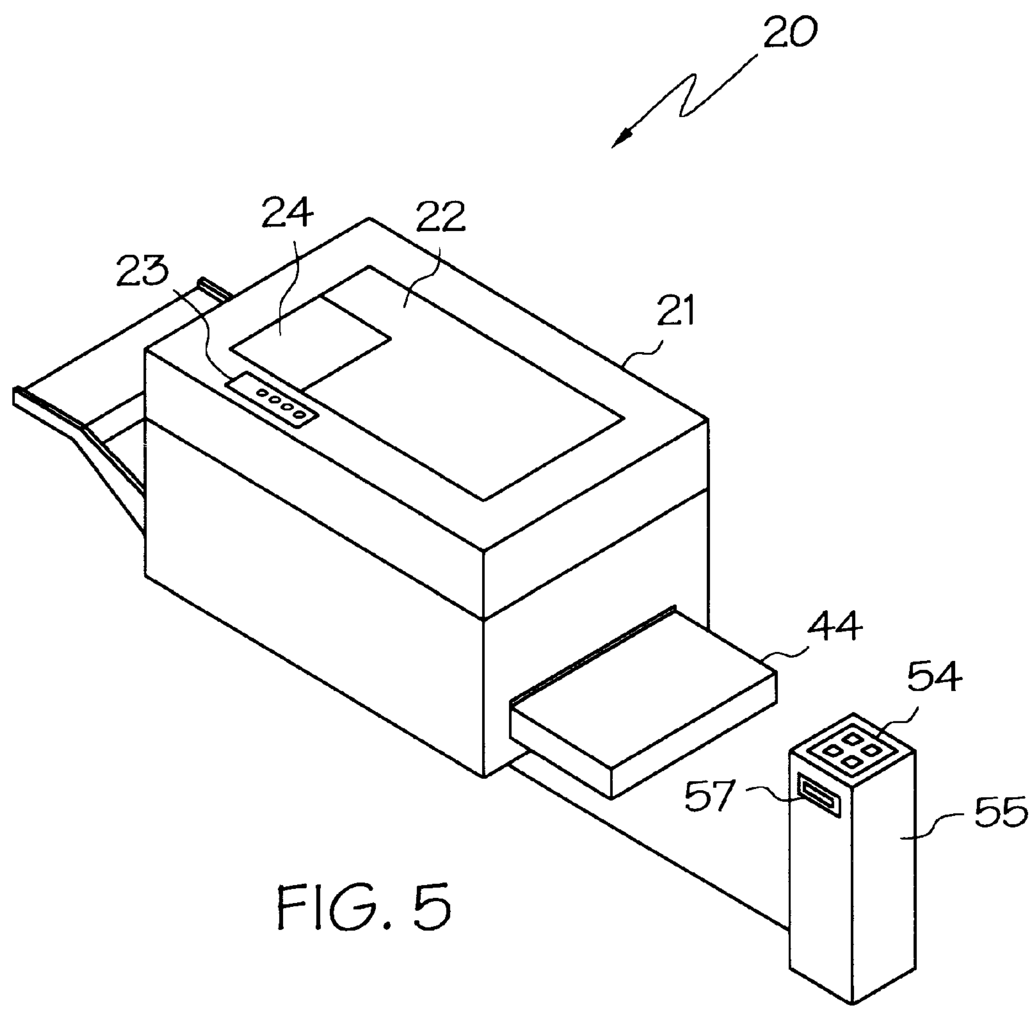
FIG. 5 is a perspective view of a digital document reproduction device made in accordance with the present invention, wherein a detached housing is provided which has a user interface and a floppy diskette drive.

In accordance with another aspect of the present invention, the conversion of the analog document reproduction device 20 to the digital document reproduction device 48 will now be described. After obtaining access to the interior of the housing 21 of the analog document reproduction device 20, the copier interface assembly 50 can be installed behind the first lens 36 adjacent the platen 22. The appropriate wires interfacing with the electric motors controlling the translating assembly 26 are located and the relay 56 interconnected with these wires, as shown in FIG. 3. If it is necessary to deactivate the photoconductor 38 (which is typically a passive device) and/or the paper feeder 44 during operation of the digital mode, the switch 64 can be interconnected between the photoconductor's charging unit 40 or the paper feeder 44 so that operation of the same is disabled. The control module 52 is installed within the housing 21 of the analog document reproduction device 20 and interconnected with the relay 56 and the power supply of the analog document reproduction device 20. The user interface 54 can be installed integrally with the housing 21 (i.e., replacing the control panel 23 of the analog document reproduction device 20) or can be installed in a housing 55 which is detached and separate from the housing 21, as shown in FIG. 5, after which the user interface 54 is connected to the control module 52. If the computer readable medium 41 is provided in the form of a floppy diskette, the a drive unit 57 for interfacing with the floppy diskette can also be disposed within the housing 55. As will be apparent, the digital document reproduction device 48 will have a separate user interfaces (e.g., 23 and 54) for each of the modes of operation if the separate housing 55 is provided. If the user interface 54 replaces the user interface 23, the user interface 54 will have to provide the functions of the original user interface 23. In addition, it is contemplated that the control module 52 may be interconnected with the user interface 23 if it is necessary to receive inputs from this user interface which are required for proper operation of the digital document reproduction device 48 in its digital mode.

In accordance with still another aspect of the present invention, the operation of the digital document reproduction device 48 will now be described. A user selects the digital mode of operation for the digital document reproduction device 48 by activating the first control 76 of the user interface 54. The user interface 54 sends a signal to the control module 52 indicating that the user has selected the digital mode. The control module 52 energizes the relay 56 and activates the electric motor 62 to move the copier interface assembly 50 into the reflected light path R. Thus, energization of the relay 56 places control of at least the light source 28 and the translating assembly 26 with the control module 52, as the analog control structures 76, 78, and 80 are disconnected from the same. After positioning the copier interface assembly 50, the control module 52 enables the control 79 so the user can initiate the digital copying of the document 24 following selection by the user of the format in which the digital information will be stored. If a control is provided for selection of a resolution for the digital information, the control module 52 activates the electric motor 39 to position the first lens 36 so that the appropriate image magnification is provided to achieve the selected resolution.

Upon user selection of the control 59, the control module 52 will activate the light source 28, which is at a home position at the beginning of the document 24. The control module 52 receives a plurality of voltage signals from the light conversion member 58, where each voltage signal corresponds to the light energy (i.e., the brightness of light) which is striking a pixel of the light conversion member 58. The voltage signal from each of the pixels is converted into a digital word by the analog to digital converter 80, and each digital word is temporarily stored in the volatile memory 81. After a voltage signal is received from each of the pixels of the light conversion member 58, the control module 52 activates the electric motor 31 to translate the translating assembly 26 in order that another portion of the document 24 is illuminated by the light source 28. The voltage signals from each of the pixels of the light conversion member 58 are again received by the control module 52 and converted to digital words, as previously described. As will be apparent, the rate of translation of the translating assembly 26 is dependent upon the resolution selected by the user and the voltage signal transmit time, the voltage signal transmit time being, in turn, a function of the clock speed of the light conversion member 58 and the brightness of the light.

After the length L of the document 24 has been traversed by the translating assembly 26 so that the images imprinted on the entire document have been stored as digital information, the control module 52 transfers the digital information from the volatile memory 81 to the computer readable medium 41 in the format selected by the user. If the document 24 comprises a plurality of pages, the above-described process can be repeated until each of the pages has been converted to digital information and stored on the computer readable medium 41. Prior to storing the digital information on the computer readable medium 41, the control module 52 can convert the digital information into any format known in the art. For example, a character recognition computer program operative on the control module 52 can convert the digital information into a format suitable for use with a word processing computer program or into a graphical format, as previously discussed. The relay 56 is then de-energized so that the control of the light source 28 and the translating assembly 26 is returned to the analog control structures 76, 78 and 80. The user interface 23 can then be accessed by a user to operate the digital document reproduction device 48 in its analog mode to produce a toner image of a document 24.

Figure 6:
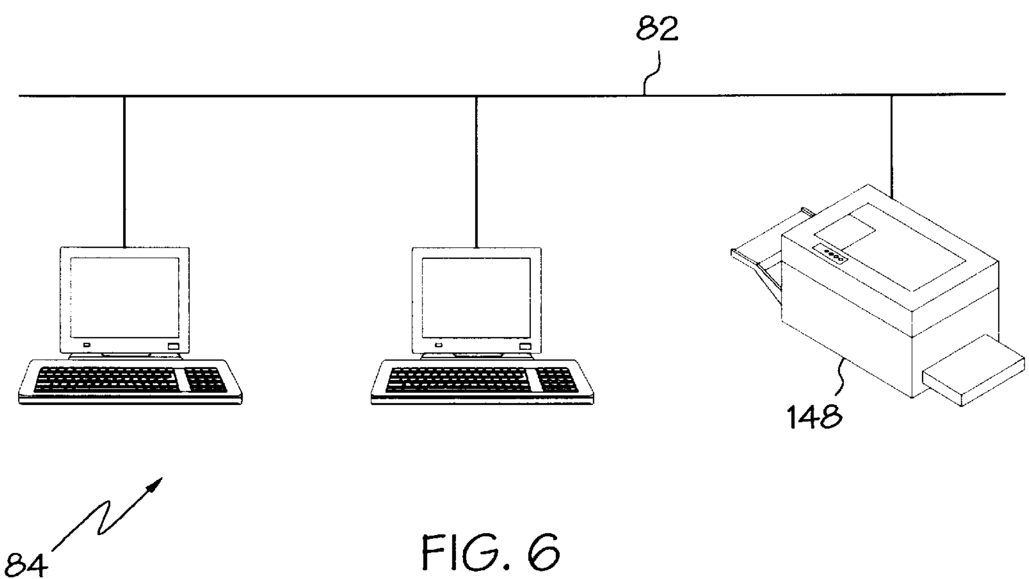
FIG. 6 is a schematic illustration of a preferred digital document reproduction device made in accordance with the present invention, wherein the device is connected to a computer network.

Another preferred embodiment of the present invention is illustrated in FIG. 6 in the form of a digital document reproduction device 148, wherein the computer readable medium 41 is supplemented and/or replaced with a computer network connection 82 interconnecting the digital document reproduction device 148 with at least one computer 84. The computer 84 can be provided in the form of any conventional or special-purpose computer, such as a desktop computer, a tower computer, a micro-computer, a mini-computer or a main frame computer. In this embodiment, the digital information associated with the document 24 can be uploaded directly to the computer 84 by the control module 52 for use by the computer 84.

Figure 7:
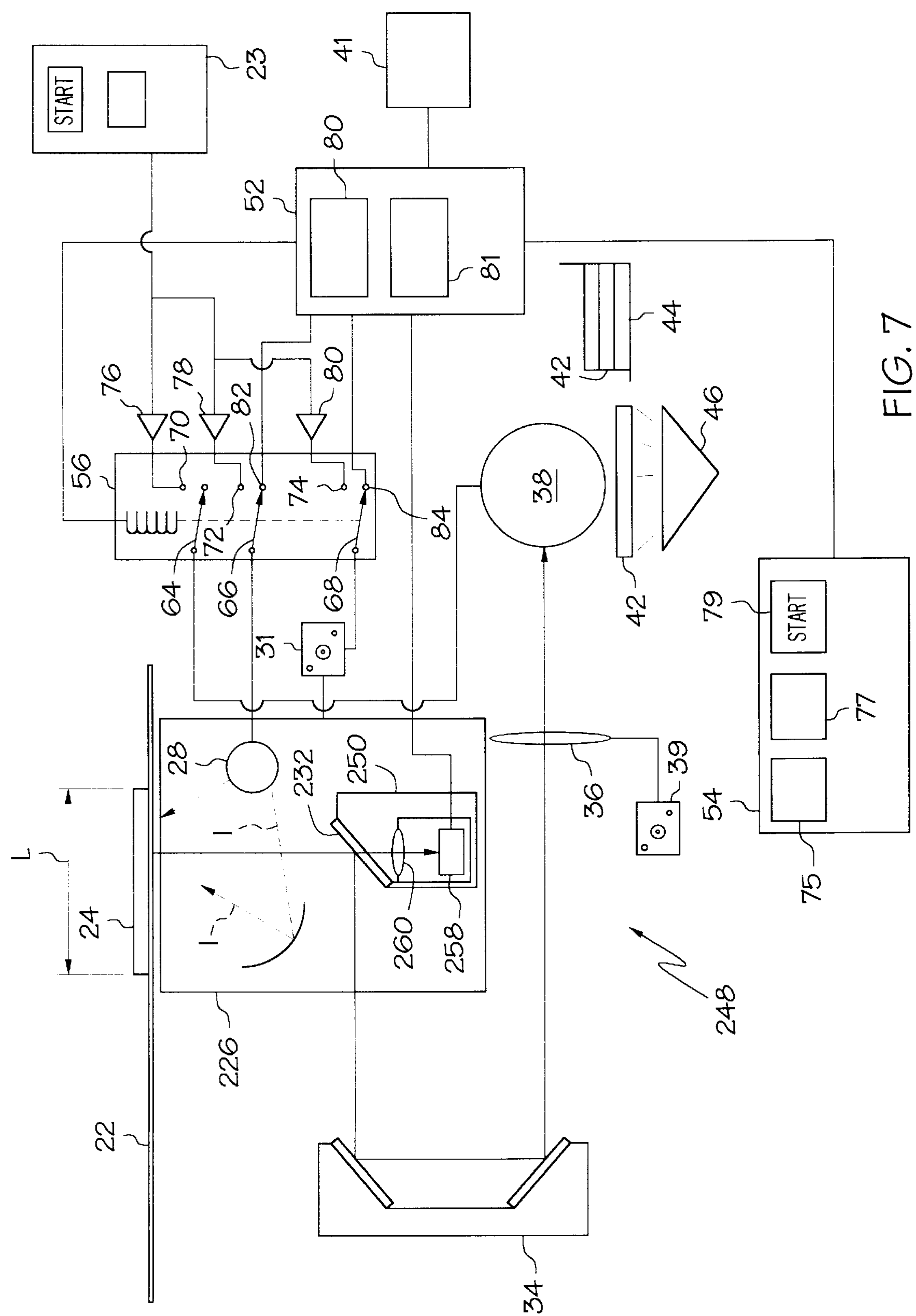
FIG. 7 is a schematic illustration of a preferred digital document reproduction device made in accordance with the present invention, wherein the copier interface assembly is disposed adjacent the first mirror.

Referring to FIG. 7, a digital document reproduction device 248 is illustrated which comprises a copier interface assembly 250 which is fixedly disposed adjacent the first mirror 232. The first mirror 232 is at least partially transparent so that some of the illumination reflected by the portion of the document 24 which is illuminated by the light source 28 can pass through to the light conversion member 258. More preferably, the first mirror 232 has a transmissibility of at least 0.1 (i.e., at least 10% of the illumination incident upon the first mirror 232 is transmitted there through), although the amount of transmissibility can be varied depending upon the amount of illumination required by the photoconductor 38 (i.e., the amount of illumination which must be reflected by the first mirror 232) and the duration of time available for illuminating the light conversion member 258. For example, a relatively lower transmissibility must be provided as the amount of illumination required by the photoconductor 38 for proper operation increases. The lower transmissibility can be compensated by a relatively higher residence time for illuminating the light conversion member 258.

The second lens 260 provides the only image magnification for the light conversion member 258 and preferably has a focal length of between about 0.2 inches and about 0.9 inches, although the range can vary depending upon the distance between the document 24 and the second lens 260 (the object distance) and the distance between the second lens 260 and the light conversion member 258 (the image distance).

In order to facilitate conversion of an existing analog document reproduction device in accordance with the present invention, one or more of the previously described components or structures used in converting an analog document reproduction device (e.g., control module, copier interface assembly, etc.) can be provided as a kit. Additional structures and components can be provided with the kit, as necessary, without departing from the scope of the present invention.

Having shown and described the preferred embodiments of the present invention, further adaption of the apparatuses and processes for converting an analog document reproduction device to a digital document reproduction device in accordance with the present invention can be accomplished by appropriate modifications by one of ordinary skill in the art without departing from the scope of the present invention. A number of alternatives and modifications have been described herein and others will be apparent to those skilled in the art. Accordingly, the scope of the present invention should be considered in terms of the following claims and is understood not to be limited to the details of the structures and processes shown and described in the specification and drawings.

What is claimed is:

1. A method for converting an operational analog document reproduction device to a digital document reproduction device, said converted document reproduction device having an analog mode and a digital mode, wherein said analog document reproduction device comprises:

a light source for illuminating at least a portion of an original document;

a mirror for receiving and reflecting said illumination reflected by said portion of said original document;

a first lens for receiving said illumination reflected by said mirror and for projecting said illumination onto a photoconductor in said analog mode, said photoconductor being capable of converting said illumination into a toner image;

the method comprises the steps of:

providing an assembly having a second lens for receiving said illumination reflected from said original document and having a light conversion member for converting said illumination into a voltage signal in said digital mode;

installing a control module for converting said voltage signal into digital information and for disabling said analog mode when said digital mode is selected by a user; and providing a user interface for selecting said digital mode and connecting said user interface to said control module.

2. The method of claim 1, further comprising the step of installing a switch for disabling operation of said photoconductor in said digital mode.

3. The method of claim 1, wherein said light conversion member is provided in the form of a charge coupled device.

4. The method of claim 1, further comprising the step of installing a device for storing said digital information on a computer readable medium.

5. The method of claim 4, wherein said device is a drive unit for a floppy diskette.

6. The method of claim 1, wherein said second lens is provided with a focal length of between about 0.2 inches and about 10 inches.

7. The method of claim 1, further comprising the step of connecting said digital document reproduction device to a computer network.

8. The method of claim 1, wherein said assembly is movable and can be selectively positioned to receive said illumination from said first lens.

9. The method of claim 1, wherein said assembly is positioned adjacent said mirror, said mirror being capable of passing at least a portion of said illumination therethrough to said assembly.

10. A method of operating a digital document reproduction device which has been converted from an analog document reproduction device, said digital document reproduction device having a digital mode of operation and an analog mode of operation, wherein said digital document reproduction device comprises:

a light source for illuminating at least a portion of an original document;

a mirror for receiving said illumination reflected by said portion of said original document;

a first lens for receiving said illumination from said mirror and for projecting said illumination onto a photoconductor in said analog mode, said photoconductor being capable of converting said illumination into a toner image;

an assembly having a second lens for receiving said illumination reflected by said original document and a light conversion member for converting said illumination into a voltage signal in said digital mode;

a control module for converting said voltage signal into digital information and for disabling said analog mode when said digital mode is selected;

a user interface connected to said control module for selecting said digital mode;

the method comprises the steps of:

illuminating at least a portion of said original document with said light source;

converting said illumination reflected from said original document into a voltage signal; and converting said voltage signal into digital information.

11. The method of claim 10, further comprising the step of disabling operation of said photoconductor in said digital mode.

12. The method of claim 10, further comprising the step of storing said digital signal on a computer readable medium.

13. The method of claim 10, further comprising the step of positioning said assembly adjacent said first lens in said digital mode to receive said illumination therefrom.

14. The method of claim 10, further comprising the step of selecting the resolution of said digital information.

15. A kit for converting an analog document reproduction device to a digital document reproduction device having an analog mode and a digital mode, wherein said analog document reproduction device comprises:

a translating light source for illuminating at least a portion of an original document, a mirror for receiving said illumination from said light source, a first lens for receiving said illumination from said mirror and for projecting said illumination onto a photoconductor in said analog mode, said photoconductor being capable of converting said illumination into a toner image;

said kit comprising:

an assembly having a second lens for receiving said illumination reflected from said original document and a light conversion member for converting said illumination into a voltage signal in said digital mode;

a control module for converting said voltage signal into digital information and for disabling said analog mode when said digital mode is selected; and a user interface for selecting said digital mode.

16. The kit of claim 15, further comprising a relay for disabling operation of said photoconductor when the digital document reproduction device is operating in a digital mode.

17. The kit of claim 15, further comprising a drive unit for a floppy diskette.

18. A document reproduction device having a digital mode and an analog mode, comprising:

a light source for illuminating at least a portion of an original document;

a mirror for receiving said illumination from said light source;

a first lens for receiving said illumination from said mirror and for projecting said illumination onto a photoconductor in said analog mode, wherein said photoconductor is capable of converting said illumination into a toner image;

an assembly having a second lens for receiving said illumination reflected from said document and having a light conversion member for converting said illumination into a voltage signal in said digital mode;

a control module for converting said voltage signal into digital information and for disabling said analog mode when said digital mode is selected; and a user interface for selecting said digital mode which is connected to said control module.

19. The document reproduction device of claim 18, further comprising a computer readable medium for storing said digital information.

20. The document reproduction device of claim 18, wherein said second lens has a focal length of between about 0.2 inches and about 10 inches.

* * * * *